(12) United States Patent
Rosko

(10) Patent No.: US 6,336,682 B1
(45) Date of Patent: Jan. 8, 2002

(54) CHILD VEHICLE SEAT WITH SHOULDER STRAP GUIDE

(76) Inventor: M. Scot Rosko, 1120 Falkirk Ct., Greenwood, IN (US) 46143

( * ) Notice: Subject to any disclaimer, the term of this patent is extended or adjusted under 35 U.S.C. 154(b) by 0 days.

(21) Appl. No.: 09/654,622

(22) Filed: Sep. 5, 2000

(51) Int. Cl.[7] .................................................. B60N 2/28
(52) U.S. Cl. ..................................... 297/483; 297/250.1
(58) Field of Search ............................. 297/250.1, 483, 297/484

(56) References Cited

U.S. PATENT DOCUMENTS

| 3,791,694 A | 2/1974 | Roberts et al. |
| 3,910,634 A | 10/1975 | Morris |
| 4,541,654 A | * 9/1985 | Jonasson ................. 297/483 X |
| 4,662,683 A | 5/1987 | Knoedler et al. |
| 4,730,875 A | * 3/1988 | Yoshitsugu ............. 297/483 X |
| 4,854,639 A | 8/1989 | Burleigh et al. |
| 5,678,887 A | 10/1997 | Sher |
| 5,733,004 A | 3/1998 | Celestina-Krevh et al. |
| 5,829,834 A | 11/1998 | Silverman |
| 5,824,740 A | 12/1998 | Lefranc |
| 5,845,967 A | 12/1998 | Kane et al. |
| 5,873,635 A | 2/1999 | Merrick |
| 5,934,749 A | * 8/1999 | Pond et al. ............. 297/483 X |
| 5,954,397 A | 9/1999 | Czernakowski et al. |
| 5,997,098 A | 12/1999 | Coffeen .................... 297/250.1 |

FOREIGN PATENT DOCUMENTS

| DE | 2513220 | * 10/1986 | ................. 297/483 |
| EP | 251242 | * 1/1988 | .............. 297/250.1 |

OTHER PUBLICATIONS

1994 Alleged Stryker Co. Public Use Drawing.
Century, Product Brochure, 1996, 2 pages.
Cosco, Product Brochure, 1999, 3 pages.
Century, Product Brochure, 1999, 6 pages.

* cited by examiner

Primary Examiner—Peter R. Brown

(57) ABSTRACT

A juvenile vehicle seat includes a molded plastic seat shell formed to include a seat portion having a back edge and a back-support portion coupled to the back edge. The back-support portion has a u-shaped perimeter and a plurality of tabs that extend from an outer leg of the u-shaped perimeter. The tabs cooperate with the perimeter to form channels adapted to receive a shoulder portion of a seat belt.

21 Claims, 2 Drawing Sheets

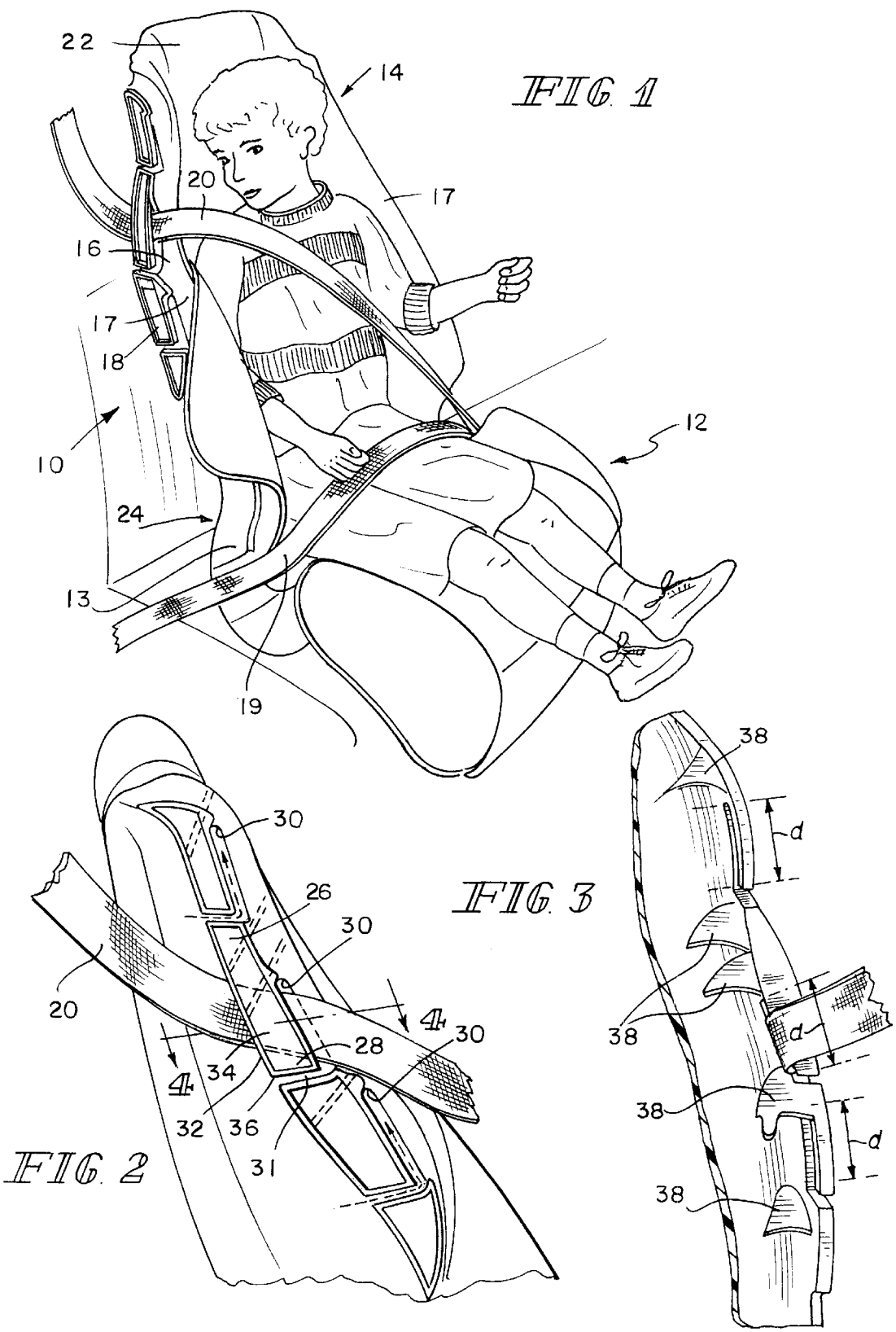

CHILD VEHICLE SEAT WITH SHOULDER STRAP GUIDE

BACKGROUND AND SUMMARY OF THE INVENTION

The present invention relates to a juvenile vehicle seat, and particularly, to a juvenile vehicle seat adapted to be mounted in a vehicle using the lap and shoulder belts of the vehicle.

Juvenile vehicle seat systems are used to secure young children safely within a vehicle. Often, juvenile vehicle seat systems are mounted to the vehicle seat using the lap belt and shoulder belt associated with the vehicle. Often, the vehicle lap and shoulder belt will also be directed around the juvenile vehicle seat in such a fashion that the shoulder and lap belt provide restraint for the juvenile seated inside the juvenile vehicle seat.

According to the invention, a juvenile vehicle seat includes a seat shell formed to include a seat portion having a back edge and a back-support portion coupled to the back edge. The back-support portion has a perimeter and a plurality of tabs that extend from a first side of the perimeter. The tabs cooperate with the perimeter to form channels adapted to receive a shoulder portion of a seat belt.

In preferred embodiments, a second plurality of tabs may be provided on a second side of the perimeter for accommodation of the juvenile vehicle seat on either side of the vehicle. A child positioned in the juvenile vehicle seat is secured using the seat belt of the vehicle, placing the shoulder portion of the seat belt in a selected one of the channels, such that the shoulder portion of the tab rests on the top of the shoulder of the child. A fabric is arranged to cover a portion of the seat shell and formed to expose the plurality of tabs such that the fabric does not interfere with the cooperation of the tabs and seat belt to retain the seat in a fixed position ion a vehicle seat.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a juvenile vehicle seat mounted in a vehicle, wherein the juvenile vehicle seat includes a belt retainer with three height-adjusting positions for insertion of the shoulder portion of the seat belt of a vehicle;

FIG 2 is a side view of the back-support portion of the juvenile vehicle seat of FIG. 1 showing the belt retainer formed to include tabs that provide channels between the tabs and the seat shell for receiving the belt;

FIG. 3 shows a rear view of the tabs and seat shell of FIGS. 1 and 2 showing the reinforcing ribs positioned between the seat shell and the tabs.

DETAILED DESCRIPTION OF THE DRAWINGS

Figure 4:
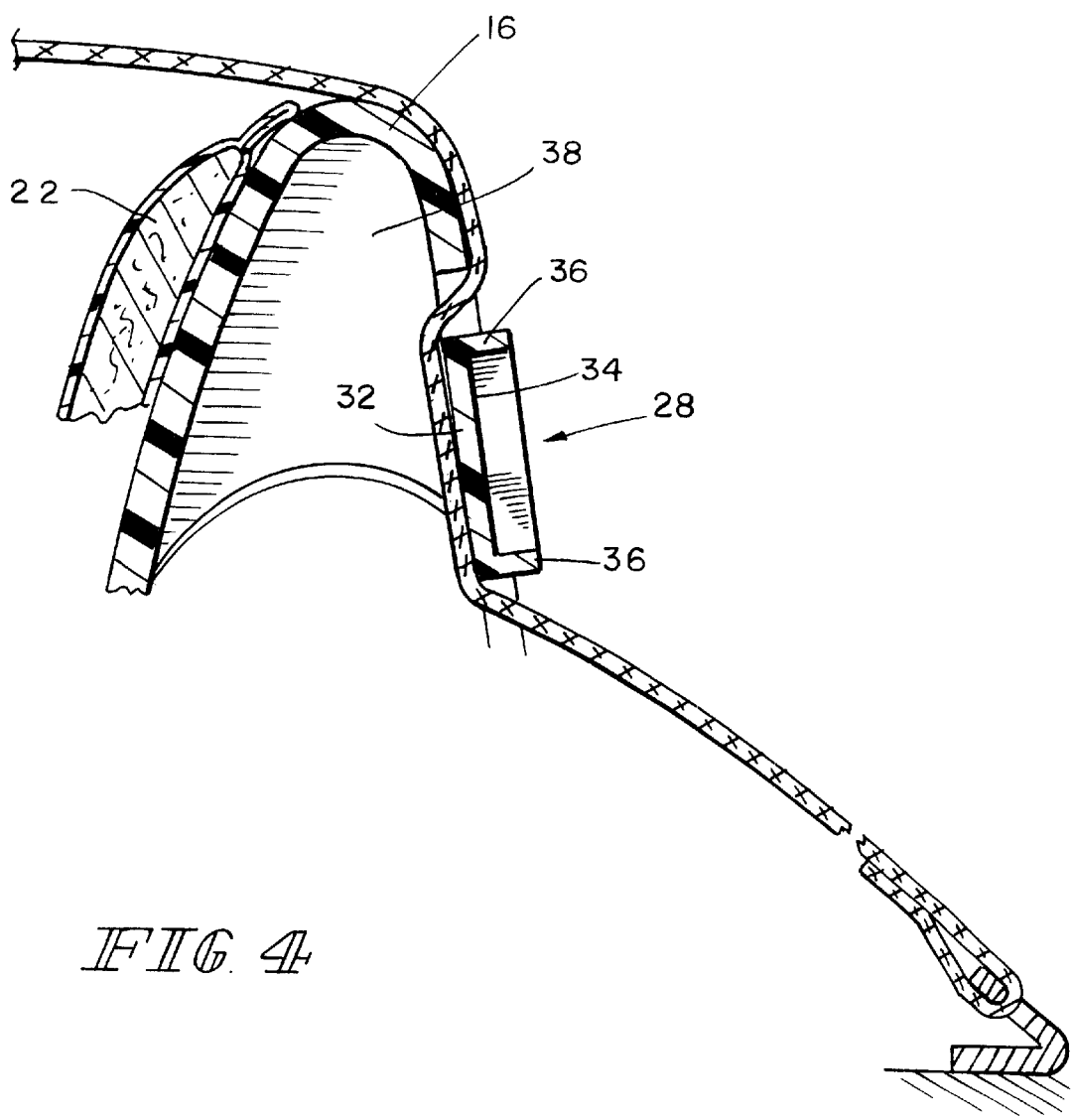
FIG. 4 is a sectional view taken along the lines 4—4 of FIG. 2, showing the positioning of the shoulder belt between the tab and the seat shell, and further showing the positioning of the fabric away from the tab.

A juvenile vehicle seat 10 for restraining a child in a vehicle includes a seat portion 12 and a back-support portion 14 having a perimeter 16 with a shoulder belt retainer, in the form of tabs 18, extending therefrom, as shown in FIG. 1, and in more detail in FIGS. 2 and 3. Juvenile vehicle seat 10 restrains a child in a seat of a vehicle using the seat belt of the vehicle, the seat belt including a lap portion 19 and a shoulder portion 20.

Juvenile vehicle seat 10 is configured to receive lap portion 19 of the seat belt between seat portion 12 and back-support portion 14 of the juvenile vehicle seat 10, such that both the child and the juvenile vehicle seat 10 are restrained in the event of a sudden stop. Tabs 18 are vertically spaced to permit selective placement of shoulder portion 20 of the seat belt in a number of positions, thereby permitting the retention of children of varying shoulder heights inside the juvenile vehicle seat 10. A padding for the juvenile in the form of a back pad or fabric covering 22 is also formed to expose tabs 18, such that shoulder portion 20 of the seat belt can be retained by tabs 18 without interference by the fabric covering, shown in FIGS. 1 and 2.

Juvenile vehicle seat 10 includes a seat shell 24 having a seat portion 12, a back edge 13 of the seat portion 12, and a back-support portion 14 extending in a substantially upward direction from back edge 13. Back-support portion 14 has a perimeter 16 substantially circumscribing back-support portion 14, and side edge portions 17, as shown in FIG. 1. Side edge portions 17 are included within the perimeter 16, and references to either element exist in such a relationship.

In one embodiment, tabs 18 are formed integrally with perimeter 16 and side edge portion 17 of seat shell 24. Tabs 18 are formed to have a first end 26 connected to a first side of the perimeter 16 and a second end 28 extending from the connected first end 26 in a substantially downward direction toward the seat portion 12, as illustrated in FIG. 2. The tabs are preferably arranged in a vertically spaced relationship, thereby providing selectable positions for placement of shoulder portion 20 of the seat belt.

A second plurality of tabs (not shown) can be provided on a second side of the perimeter 16, wherein the second side is substantially opposite the first side. The second plurality of tabs allows juvenile vehicle seat 10 to be positioned in a vehicle with a shoulder belt coming from either side of the juvenile vehicle seat 10.

It will be appreciated that while the tabs are preferably formed integrally with the perimeter 16 of the seat shell 24. Alternatively, first end 26 of tabs 18 can be attached to perimeter 16 with a fastener (not shown), such that second end 28 of tabs 18 extends from the attached first end in a substantially downward direction toward the seat portion 12.

Each tab 18 cooperates with perimeter 16 to define a channel or notch 30 having a mouth 31 at second end 28 of tab 18, wherein channel 30 is adapted to receive shoulder portion 20 of the seat belt. Channel 30 is configured to extend upwardly along perimeter 16 of seat shell 24 for a distance d that is sufficient to allow shoulder portion 20 of the seat belt to rest completely inside channel 30, as shown in FIG. 3. An inner surface 32 of the tabs is positioned to face inwardly, while an outer surface 34 faces outwardly from back support portion 14, as indicated in FIGS. 2 and 4.

Tabs 18 can be strengthened by methods known in the art, for example, by forming tabs 18 with bossed edges 36, as illustrated in FIG. 2 and in cross-sectional view in FIG. 4. Tabs 18 can be further reinforced with webs or ribs 38 formed between perimeter 16 and tabs 18, as shown in FIGS. 3 and 4.

Fabric covering 22 is configured to expose tabs 18, as shown in FIGS. 1 and 3. By forming fabric covering 22 to be cut away around tabs 18, a clearance is provided for the insertion of shoulder portion 20 of the seat belt into channel 30. The configuration of fabric covering 22 prevents any potential hindrance fabric covering 22 may have on the proper functioning of the shoulder portion 20 of the seat belt within the channel 30. Furthermore, the configuration of fabric covering 22 provides better access to tabs 18 where shoulder portion 20 of the seat belt is retained.

A child is properly restrained in juvenile vehicle seat 10 within a vehicle in the following manner. Juvenile vehicle seat 10 is positioned on a seat of a vehicle such that lap portion 19 of the seat belt is on one side of juvenile vehicle seat 10, while the seat belt latching mechanism (not shown) is on the other side of juvenile vehicle seat 10. The child is placed in the juvenile vehicle seat and lap portion 19 of the seat belt is drawn across the lap of the child and joined with the seat belt latching mechanism as known in the art. Shoulder portion 20 of the seat belt is then selectively positioned in one of the channels 30 such that the shoulder portion 20 rests on the top of the shoulder and drapes across the chest of the child. The provision of a plurality of tabs 18 made integral with or fastened to the perimeter 16 of the back-support portion 14 allows for the accommodation of children of varying shoulder heights within juvenile vehicle seat 10, or for the growth of a child through various shoulder heights, while providing a safe and strong retention point for the shoulder portion 20 of the seat belt.

Although the invention has been described in detail with reference to certain preferred embodiments, variations and modifications exist within the scope and spirit of the invention as described and defined in the following claims.

What is claimed is:

1. A juvenile vehicle seat comprising
   a molded plastic seat shell formed to include a seat portion having a back edge and a molded plastic back-support portion coupled to the back edge and extending upwardly therefrom, the back-support portion having a u-shaped perimeter with a rearwardly extending side edge portion, and
   a plurality of tabs integrally molded with the back-support portion arid extending from the rearwardly extending side edge portion of the perimeter, each tab cooperating with the perimeter to form a channel adapted to receive a shoulder portion of a seat belt.

2. The juvenile vehicle seat of claim 1, further comprising a fabric covering a portion of the seat shell, the fabric being formed to expose the plurality of tabs.

3. The juvenile vehicle seat of claim 1, wherein the tabs are arranged in a substantially vertically spaced relationship, each tab extending from the perimeter with a downwardly extending portion therefrom.

4. The juvenile vehicle seat of claim 1, further comprising a second plurality of integrally molded tabs extending from a second and substantially opposite sided perimeter.

5. The juvenile vehicle seat of claim 1, wherein each of the tabs includes an outer surface facing away from the back-support portion.

6. The juvenile vehicle seat of claim 5, wherein the outer surface is formed to include a reinforced portion for strengthening the tabs.

7. The juvenile vehicle seat of claim 1, wherein the channel substantially defines a slot.

8. The juvenile vehicle seat of claim 1, wherein the channel extends a distance at least as great as a width of the shoulder portion of the seat belt.

9. The juvenile vehicle seat of claim 1, wherein each of the plurality of tabs is positioned such that an end of the tab points in a substantially downward direction.

10. The juvenile vehicle seat of claim 1 including
    a fabric cover for the back-support portion, the fabric cover being formed to expose the channel.

11. The juvenile vehicle seat of claim 10, wherein the fabric cover is formed to provide access to the channel.

12. The juvenile vehicle seat of claim 10, wherein the fabric cover is cut away to expose the channel.

13. The juvenile vehicle seat of claim 10, wherein the fabric cover is adapted to allow passage of the shoulder portion of the seat belt through the channel without the seat belt contacting the fabric cover.

14. The juvenile vehicle seat of claim 10, wherein the channel provides a plurality of vertically spaced channels for selectively positioning the shoulder portion.

15. A method of retaining a juvenile in a seat of a vehicle, comprising the steps of
    providing a molded plastic juvenile seat shell having an integrally molded seat section a back support section and a u-shaped perimeter portion on the back-support section, and
    providing a retainer integrally molded on an outside leg of the u-shaped perimeter part, the retainer defining at least one fore and aft extending channel being adapted to receive a shoulder portion of a seat belt to retain a juvenile in the seat.

16. The method of claim 15, further comprising the step of providing a fabric cover for covering a portion of the juvenile seat shell, the fabric cover being formed to expose the retainer.

17. A juvenile vehicle seat comprising
    a molded plastic seat shell formed to include a seat portion, a basic support portion extending upwardly therefrom and a u-shaped perimeter portion extending from the back-support portion, and
    a plurality of tabs integrally molded with the seat shell and extending from an outer leg of the unshaped perimeter portion, each tab cooperating with the u-shaped perimeter portion to form a channel portion that extends in a fore and aft direction of the seat and is adapted to receive a shoulder portion of a seat belt.

18. The juvenile vehicle seat of claim 17, wherein the outer leg, of the u-shaped perimeter portion includes an upwardly and rearwardly extending flange, each channel extending into the flange and having an integrally molded tab associated therewith to define a mouth into the channel.

19. The juvenile vehicle seat of claim 18, wherein each channel has an upper and lower portion and each tab extends downwardly to define the mouth into its associated notch at the lower end of the notch.

20. The juvenile vehicle seat of claim 17, wherein the seat comprises a back pad having an upper side portion formed to provide access to the notches.

21. The juvenile vehicle seat of claim 17, wherein the u-shaped perimeter portion extends around the back portion and tabs and channels are provided on both sides of the back portion.

* * * * *

UNITED STATES PATENT AND TRADEMARK OFFICE
CERTIFICATE OF CORRECTION

PATENT NO.    : 6,336,682 B1
DATED         : January 8, 2002
INVENTOR(S)   : Rosko It is certified that error appears in the above-identified patent and that said Letters Patent is hereby corrected as shown below:

<u>Column 3,</u>
Line 33, Claim 1 should read as follows:

1. A juvenile vehicle seat comprising a molded plastic seat shell formed to include a seat portion having a back edge and a molded plastic back-support portion coupled to the back edge and extending upwardly therefrom, the back-support portion having a u-shaped perimeter with a rearwardly extending side edge portion, and
     a plurality of tabs integrally molded with the back-support portion and extending from the rearwardly extending side edge portion of the perimeter, each tab cooperating with the Perimeter to form a channel adapted to receive a shoulder portion of a seat belt.

17. A juvenile vehicle seat comprising
     a molded plastic seat shell formed to include a seat portion, a back-support portion extending upwardly therefrom and a u-shaped perimeter portion extending from the back-support portion, and
     a plurality of tabs integrally molded with the seat shell and extending from an outer leg of the u-shaped perimeter portion, each tab cooperating with the u-shaped perimeter portion to form a channel portion that extends in a fore and aft direction of the seat and is adapted to receive a shoulder portion of a seat belt.

Signed and Sealed this

Fourth Day of November, 2003

JAMES E. ROGAN
*Director of the United States Patent and Trademark Office*